United States Patent
Staunton et al.

(10) Patent No.: US 7,279,525 B2
(45) Date of Patent: Oct. 9, 2007

(54) CURABLE COMPOSITIONS

(75) Inventors: Thomas J. Staunton, Nettuno (IT); Weilin Tang, Solon, OH (US)

(73) Assignee: The Sherwin-Williams Company, Cleveland, OH (US)

( * ) Notice: Subject to any disclaimer, the term of this patent is extended or adjusted under 35 U.S.C. 154(b) by 0 days.

(21) Appl. No.: 11/199,693

(22) Filed: Aug. 9, 2005

(65) Prior Publication Data

US 2006/0052525 A1    Mar. 9, 2006

Related U.S. Application Data

(63) Continuation of application No. 10/701,858, filed on Nov. 5, 2003, now abandoned.

(60) Provisional application No. 60/424,146, filed on Nov. 5, 2002.

(51) Int. Cl.
*C08G 18/08* (2006.01)
*C08G 18/62* (2006.01)
*C08G 18/65* (2006.01)
*C09D 175/04* (2006.01)

(52) U.S. Cl. .................... 525/123; 525/131; 525/328.8; 525/370; 525/384

(58) Field of Classification Search ................ 525/123, 525/131, 328.8, 370, 384
See application file for complete search history.

(56) References Cited

U.S. PATENT DOCUMENTS 3,808,162 A * 4/1974 Allen et al. .................... 528/49
6,326,059 B1 * 12/2001 Lewin et al. ................ 427/379

FOREIGN PATENT DOCUMENTS

JP          05093028 A    *   4/1993

* cited by examiner

*Primary Examiner*—Kelechi C. Egwim
(74) *Attorney, Agent, or Firm*—Deron A. Cook; Robert E. McDonald; Arthi K. Tirey

(57) ABSTRACT

This invention relates to a curable composition comprising a solvent solution of a mixture comprising:
- (i) at least one hydroxy-functional acrylic-polymer; and
- (ii) at least one low molecular weight polyol reactive diluent;
- (iii) at least one polyisocyanate;
- (iv) a metal catalyst, such as a tin compound, for accelerating the isocyanate/hydroxyl reaction; and
- (v) propionic acid.

15 Claims, No Drawings

CURABLE COMPOSITIONS

CROSS-REFERENCE TO RELATED APPLICATION

This application is a continuation of U.S. patent application Ser. No. 10/701,858, filed on Nov. 5, 2003, now abandoned which claims the benefit of U.S. provisional patent application No. 60/424,146 filed on Nov. 5, 2002, the entirety of which are hereby incorporated by reference.

BACKGROUND OF THE INVENTION

1. Field of the Invention

This invention relates to a curable composition comprising a solvent solution of a mixture comprising:
 (i) at least one hydroxy-functional acrylic polymer; and
 (ii) optionally, for especially high solid applications, at least one low molecular weight polyol reactive diluent;
 (iii) at least one polyisocyanate;
 (iv) a metal catalyst, such as a tin compound, for accelerating the isocyanate/hydroxyl reaction; and
 (v) propionic acid.

The curable compositions of this invention are especially useful as coatings and may typically be utilized as primers, topcoats or as clearcoats and/or basecoats in clearcoat/basecoat compositions and are especially useful in spray applications. In particular, the combination of these materials provides fast reacting, durable coatings having extended pot-life and excellent cure. The compositions of this invention could also be utilized as adhesives, elastomers and plastics. Although it is not our intention to be bound by theory, it appears that the use of propionic acid, due to its ease of handling and evaporation rate, has special utility in spray applications and ambient air cures. Surprisingly, propionic acid has shown superior performance, especially in high solid spray applications, compared to other similar organic acids such as acetic acid.

2. Description of the Prior Art

Two-component curable mixtures comprising polyisocyanates and active hydrogen-containing compounds, such as polyols or polyamines, are well-known in the art to provide excellent performance and cure at low temperatures. However, due to the reactivity of the isocyanates and the active hydrogen-containing compounds, it is often difficult to obtain long pot-lifes of the mixture of polyisocyanate and active hydrogen-containing material and yet still enjoy the benefits of rapid cure. This is especially true for low VOC materials, which will incorporate relatively low levels of solvent A number of approaches to extending the pot-life of mixtures of polyisocyanates and active hydrogen-containing compounds, have been taught in the prior art. For example, U.S. Pat. No. 3,808,162 teaches polyurethane catalyst combinations of metals with organic acids, including propionic acid in certain polyol/isocyanate applications. U.S. Pat. No. 4,426,510 teaches the use of beta-dicarbonyl compounds, alpha-hydroxy ketones, fused aromatic beta-diketones and beta-hydroxy nitrogen-heterocyclic fused aromatics as pot-life extenders for certain metal catalyzed polyol/poly-isocyanate combinations. U.S. Pat. No. 4,235,766 teaches the addition of certain 2-methyl-2-alkanols to extend the pot-life of isocyanate/polyol mixtures. U.S. Pat. No. 4,096,128 teaches the use of certain triazoles to extend the pot-life of isocyanate/diamine mixtures. U.S. Pat. No. 4,019,933 teaches use of reaction products of tri-functional aziridinyl phosphine oxides with carboxylic acids to extend pot-life. U.S. Pat. No. 4,184,031 teaches the use of a composition of matter comprising a metallo organic compound and a carboxylic acid, or a compound convertible thereto, such as a carboxylic anhydride, by reaction with an active hydrogen compound. U.S. Pat. No. 4,341,689 teaches polyurethanes catalyzed by amines and metal compounds in the presence of pot-life extending amounts of acetic or formic acid, but expressly teaches that propionic acid is not useful due to its slow vaporization. U.S. Pat. No. 4,877,829 teaches the use of organic and inorganic acids, such as benzoyl chloride, p-toluene sulfonic acid, formic acid, acetic acid, benzoic acid, phosphoric acid, hydrochloric acid and the like. U.S. Pat. No. 5,157,100 teaches the use of polyanhydride materials to extend the pot-life of active hydrogen containing materials such as polyols and polyamines with polyisocyanates. The prior art has not, however, taught the solvent borne combination of:
 (i) at least one hydroxy functional acrylic polymer;
 (ii) at least one low molecular weight polyol diluent;
 (iii) at least one polyisocyanate;
 (iv) a metal catalyst such as a tin compound; and
 (v) a pot-life extending amount of propionic acid to provide low temperature curing, extended pot-life materials having excellent durability, hardness and performance upon cure. This invention also relates to the process of spray application of the solvent borne curable composition and its subsequent cure by exposure to heat, or preferably for certain applications, at ambient temperatures.

BRIEF SUMMARY OF THE INVENTION

This invention involves a multi-component curable composition which is reactive upon mixing of the components and which comprises the solvent borne mixture of:
 (i) at least one hydroxy functional acrylic polymer;
 (ii) at least one low molecular weight polyol diluent;
 (iii) at least one polyisocyanate;
 (iv) a metal catalyst such as a tin compound; and
 (v) a pot-life extending amount of propionic acid The hydroxy functional acrylic polymer will be a "film-forming polymer" that can form a film from evaporation of any carrier or solvent.

When utilized as a coating or an adhesive, the curable composition of this invention will be used in combination with about 5 to about 80%, and preferably 10 to about 40%, by weight of an inert solvent. It is especially preferred that the curable composition will have a sprayable viscosity less than about 25 seconds, and especially less than about 20 seconds, when measured by a #2 Zahn cup and when formulated to a VOC level of 3.5#/gallon. It is convenient to provide the curable composition as a multicomponent system which is reactive upon mixing the components. Generally, the active hydrogen-containing components and the polyisocyanate component will be maintained in separate packages and mixed just prior to use. By incorporating a pot-life extending amount of a propionic acid in the mixture, it has surprisingly been found that the pot-life of the mixture can be significantly extended without adversely affecting cure or other properties of the final cured product. The metal catalyst can be incorporated into either component, or into a diluting solvent ahead of time, but is generally preferred to add the propionic acid to the active hydrogen-containing portion or the diluting solvent rather than the polyisocyanate portion.

Accordingly, it is an object of this invention to provide a method for extending the pot-life of solvent borne mixtures of polyisocyanates and active hydrogen-containing materials by incorporating propionic acid into the mixture. It is a further object of this invention to provide curable, reactive compositions having extended pot-life. Another object of this invention is to provide curable compositions which are useful as primers, topcoats or clearcoats and/or basecoats in clearcoat/basecoat compositions. A preferred object is to provide curable compositions comprising (on a weight solids basis of the vehicle solids):

(i) 20-70% parts of a hydroxy functional acrylic polymer having a number average molecular weight less than about 3,000, and preferably less than 2,400;

(ii) 2-30% of a low molecular weight polyol reactive diluent;

(iii) 10-55% of a polyisocyanate;

(iv) at least 0.01 and preferably at least 0.05% of a tin catalyst compound such as dibutyltin dilaurate; and (v) 0.1 to about 3.0% propionic acid.

DETAILED DESCRIPTION OF THE INVENTION

1. Hydroxy-Functional Acrylic Polymers.

For many applications, especially those requiring a minimum amount of solvent, the hydroxy-functional acrylic polymers useful in this invention will have an average of at least two active hydrogen groups per molecule and a number average molecular weight less than about 3,000, and preferably less than about 2,400.

The hydroxy-functional acrylic polymers can be conveniently prepared by free radical polymerization techniques as is well known in the art. The acrylic polymers are typically prepared by the addition polymerization of one or more monomers. At least one of the monomers will contain, or can be reacted to produce, a reactive hydroxyl group. Representative hydroxy-functional monomers include 2-hydroxyethyl acrylate, 2-hydroxyethyl methacrylate, 2-hydroxypropyl acrylate, 4-hydroxybutyl methacrylate, 2-hydroxypropyl methacrylate, 3-hydroxybutyl acrylate, 4-hydroxypentyl acrylate, 2-hydroxyethyl ethacrylate, 3-hydroxybutyl methacrylate, 2-hydroxyethyl chloroacrylate, diethylene glycol methacrylate, tetraethylene glycol acrylate, para-vinyl benzyl alcohol, etc. Typically the hydroxy-functional monomers would be copolymerized with one or more monomers having ethylenic unsaturation such as:

(i) esters of acrylic, methacrylic, crotonic, tiglic, or other unsaturated acids such as:

methyl acrylate, ethyl acrylate, propyl acrylate, isopropyl acrylate, butyl acrylate, isobutyl acrylate, ethylhexyl acrylate, amyl acrylate, 3,5,5-trimethylhexyl acrylate, methyl methacrylate, ethylmethacrylate, propyl methacrylate, dimethylaminoethyl methacrylate, isobornyl methacrylate, ethyl tiglate, methyl crotonate, ethyl crotonate, etc.;

(ii) vinyl compounds such as vinyl acetate, vinyl propionate, vinyl butyrate, vinyl isobutyrate, vinyl benzoate, vinyl m-chlorobenzoate, vinyl p-methoxybenzoate, vinyl alpha-chloroacetate, vinyl toluene, vinyl chloride, etc.;

(iii) styrene-based materials such as styrene, alpha-methyl styrene, alpha-ethyl styrene, alpha-bromo styrene, 2,6-dichlorostyrene, etc.;

(iv) allyl compounds such as allyl chloride, allyl acetate, allyl benzoate, allyl methacrylate, etc.;

(v) other copolymerizable unsaturated monomers such as ethylene acrylonitrile, methacrylonitrile, dimethyl maleate, isopropenyl acetate, isopropenyl isobutyrate, acrylamide, methacrylamide, dienes such as 1,3-butadiene, and halogenated materials such as 2-(N-ethylperflourooctenesulfonamido)ethyl(meth)acrylate.

The polymers are conveniently prepared by conventional free radical addition polymerization techniques. Frequently, the polymerization will be initiated by conventional initiators known in the art to generate a free radical such as azobis(isobutyronitrile), cumene hydroperoxide, t-butyl perbenzoate, etc. Typically, the monomers are heated in the presence of the initiator at temperatures ranging from about 35° C. to about 200° C., and especially 75° C. to 150° C., to effect the polymerization. The molecular weight of the polymer can be controlled, if desired, by the monomer selection, reaction temperature and time, and/or the use of chain transfer agents as is well known in the art.

2. Low Molecular Weight Polyol Diluent.

The low molecular weight polyol diluents useful in this invention will typically have number average molecular weights less than about 1,000 and preferably less than about 500 and will include polyether polyols, polycaprolactone polyols and saturated and unsaturated polyols. Representative polyol diluents include diols such as ethylene glycol, dipropylene glycol, 2,2,4-trimethyl 1,3-pentanediol, neopentyl glycol, 1,2-propanediol, 1,4-butanediol, 1,3-butanediol, 2,3-butanediol, 1,5-pentanediol, 1,6-hexanediol, 2,2-dimethyl-1,3-propanediol, 1,4-cyclohexanedimethanol, 1,2-cyclohexanedimethanol, 1,3-cyclohexanedimethanol, 1,4-bis(2-hydroxyethoxy)cyclohexane, trimethylene glycol, tetramethylene glycol, pentamethylene glycol, hexamethylene glycol, decamethylene glycol, diethylene glycol, triethylene glycol, tetraethylene glycol, norbornylene glycol, 1,4-benzenedimethanol, 1,4-benzenediethanol, 2,4-dimethyl-2-ethylenehexane-1,3-diol, 2-butene-1,4-diol, and polyols such as trimethylolethane, trimethylolpropane, trimethylolhexane, triethylolpropane, 1,2,4-butanetriol, glycerol, pentaerythritol, dipentaerythritol, etc.

3. Polyisocyanate Compounds.

Polyisocyanates useful in the compositions of this invention have an average of at least about two isocyanate groups per molecule. Representative polyisocyanates having two or more isocyanate groups per molecule include the aliphatic compounds such as ethylene, trimethylene, tetramethylene, pentamethylene, hexamethylene, 1,2-propylene, 1,2-butylene, 2,3-butylene, 1,3-butylene, ethylidene and butylidene diisocyanates; the cycloalkylene compounds such as 3-isocyanatomethyl-3,5,5-trimethylcyclohexylisocyanate, and the 1,3-cyclopentane, 1,3-cyclohexane, and 1,2-cyclohexane diisocyanates; the aromatic compounds such as m-phenylene, p-phenylene, 4,4'-diphenyl, 1,5-naphthalene and 1,4-naphthalene diisocyanates; the aliphatic-aromatic compounds such as 4,4'-diphenylene methane, 2,4- or 2,6-toluene, or mixtures thereof, 4,4'-toluidine, and 1,4-xylylene diisocyanates; the nuclear substituted aromatic compounds such as dianisidine diisocyanate, 4,4'-diphenylether diisocyanate and chlorodiphenylene diisocyanate; the triisocyanates such as triphenyl methane-4,4',4"-triisocyanate, 1,3,5-triisocyanate benzene and 2,4,6-triisocyanate toluene; and the tetraisocyanates such as 4,4'-diphenyl-dimethyl methane-2, 2'-5,5'-tetraisocyanate; the polymerized polyisocyanates such as tolylene diisocyanate dimers and trimers, and other various polyisocyanates containing biuret, urethane, and/or allophanate linkages.

The ratio of equivalents of isocyanate to active hydrogen can be widely varied within the practice of this invention. The polyisocyanate will typically be present at a level to provide about 0.3 to about 2.0, and preferably about 0.7 to about 1.3 equivalents of isocyanate for each equivalent of active hydrogen from the acrylic resin and polyol diluent.

The curable compositions of this invention can be cured at temperatures ranging from about room temperature up to about 350° F. The advantages of using propionic acid are particularly apparent in relatively low temperature cures near ambient room temperature. If used as coatings, the curable compositions can be used as clear coatings or they may contain pigments as is well known in the art. Representative opacifying pigments include white pigments such as titanium dioxide, zinc oxide, antimony oxide, etc. and organic or inorganic chromatic pigments such as iron oxide, carbon black, phthalocyanine blue, etc. The coatings may also contain extender pigments such as calcium carbonate, clay, silica, talc, etc.

The coatings may also contain other additives such as flow agents, catalysts, solvents, ultraviolet light absorbers, etc. Typical metal catalysts for the reaction between the polyisocyanate and the active hydrogen-containing material include tin, zinc and copper materials such as dibutyl tin dilaurate, zinc octoate, and copper naphthenate. Organometallic tin compounds, such as dibutyltin dilaurate, are preferred in the practice of this invention.

The coatings of this invention may typically be applied to any substrate such as metal, plastic, wood, glass, synthetic fibers, etc. by brushing, dipping, roll coating, flow coating, spraying or other method conventionally employed in the coating industry. Spraying is the especially preferred process and while it is not our intent to be bound by theory, it is believed that the volatilization of the coating during spraying at ambient temperatures causes some, but not all, of the propionic acid to evaporate, while the rest evaporates gradually from the film. Surprisingly, propionic acid apparently allows the film to remain open, even for high solid applications, long enough for sufficient solvent evaporation to minimize die-back and solvent popping and other potential film problems. If desired, the substrates may be primed prior to application of the coatings of this invention.

One preferred application of the curable compositions of this invention relates to their use as clearcoats and/or basecoats in clearcoat/basecoat formulations. Low VOC clearcoats are an especially useful application of this invention.

Clearcoat/basecoat systems are well known, especially in the automobile industry where it is especially useful to apply a pigmented basecoat, which may contain metallic pigments, to a substrate and allow it to form a film followed by the application of a clearcoat. The basecoat composition may be any of the polymers known to be useful in coating compositions including the reactive compositions of this invention.

One useful polymer basecoat includes the acrylic addition polymers, particularly polymers or copolymers of one or more alkyl esters of acrylic acid or methacrylic acid, optionally together with one or more other ethylenically unsaturated monomers. These polymers may be of either the thermoplastic type or the thermosetting, crosslinking type which contain hydroxyl or amine or other reactive functionality which can be crosslinked. Suitable acrylic esters for either type of polymer include methyl methacrylate, ethyl methacrylate, propyl methacrylate, butyl methacrylate, ethyl acrylate, butyl acrylate, vinyl acetate, acrylonitrile, acrylamide, styrene, vinyl chloride, etc. Where the polymers are required to be of the crosslinking type, suitable functional monomers which can be used in addition to those already mentioned include acrylic or methacrylic acid, hydroxy ethyl acrylate, 2-hydroxy propyl methacrylate, glycidyl acrylate, tertiary-butyl amino ethyl methacrylate, etc. The basecoat composition may, in such a case, also contain a crosslinking agent such as a polyisocyanate, a polyepoxide, or a nitrogen resin such as a condensate of an aldehyde such as formaldehyde with a nitrogeneous compound such as urea, melamine or benzoguanamine or a lower alkyl ether of such a condensate. Other polymers useful in the basecoat composition include vinyl copolymers such as copolymers of vinyl esters of inorganic or organic acids, such as vinyl chloride, vinyl acetate, vinyl propionate, etc., which copolymers may optionally be partially hydrolyzed so as to introduce vinyl alcohol units.

Other polymers useful in the manufacture of the basecoat include alkyd resins or polyesters which can be prepared in a known manner by the condensation of polyhydric alcohols and polycarboxylic acids, with or without the inclusion of natural drying oil fatty acids as described elsewhere in this specification. The polyesters or alkyds may contain a proportion of free hydroxyl and/or groups which are available for reaction, if desired with suitable crosslinking agents as discussed above.

If desired, the basecoat composition may also contain minor amounts of a cellulose ester, to alter the drying or viscosity characteristics of the basecoat.

Typically, the basecoat will include pigments conventionally used for coating compositions and after being applied to a substrate, which may or may not previously have been primed, the basecoat will be allowed sufficient time to form a polymer film which will not be lifted during the application of the clearcoat. The basecoat may be heated or merely allowed to air-dry to form the film. Generally, the basecoat will be allowed to dry for about 1 to 20 minutes before application of the clearcoat. The clearcoat is then applied to the surface of the basecoat, and the system can be allowed to dry at room temperature or, if desired, can be force dried by baking the coated substrate at temperatures typically ranging up to about 350° F.

Typically, the clearcoat may contain ultraviolet light absorbers such as hindered phenols or hindered amines at a level ranging up to about 6% by weight of the vehicle solids as is will known in the art. The clearcoat can be applied by any application method known in the art, but preferably will be spray applied. If desired, multiple layers of basecoat and/or clearcoat can be applied. Typically, both the basecoat and the clearcoat will each be applied to give a dry film thickness of about 0.2 to about 6, and especially about 0.5 to about 3.0, mils.

If desired, the novel reactive compositions taught herein could be used as a basecoat, in which case the clearcoat could also comprise the novel reactive coatings taught herein, or the polymers taught herein as being useful as basecoat formulations could be utilized as clearcoats.

The following examples have been selected to illustrate specific embodiments and practices of advantage to a more complete understanding of the invention. Unless otherwise stated, "parts" means parts-by-weight and "percent" is percent-by-weight.

EXAMPLE 1

A representative acrylic polymer was prepared by the free radical polymerization reaction of the following materials in the presence of aromatic naphtha and N-butyl acetate

| Raw Material | Parts by Weight |
| --- | --- |
| T-Amylethylhexylperoxycarbonate | 34.14 |
| Methyl Methacrylate | 106.17 |
| Butyl Acrylate | 159.14 |
| Hydroxy Ethyl Methacrylate | 151.11 |
| Styrene | 110.95 |
| Methacrylic Acid | 3.27 | to produce a polymer having a weight/gallon of about 8.58 at 65% NVM.

EXAMPLE 2

A clearcoating was prepared by admixing the following materials:

| Raw Material | Parts by Weight |
| --- | --- |
| Acrylic Resin of Example 1 | 44.15 |
| 1,4-Cyclohexanedimethanol | 7.21 |
| n-butyl acetate | 4.84 |
| ethyl acetate | 13.96 |
| Tinuvin ® 292 (light stabilizer from Ciba-Geigy) | 1.44 |
| Tinuvin ® 384 (UV absorber from Ciba-Geigy) | 1.44 |
| Dibutyltin dilaurate | 0.18 |
| Ethyl 3-ethoxypropionate | 4.69 |
| Butyl propionate | 6.53 |
| Byk ™ 300 (flow agent from Byk Chemie) | 0.43 |
| Propionic acid | 0.72 |

This clearcoating was admixed with 45.17 parts of a 75.2% weight solids solution of Tolonate® HDT LV polyisocyanates in n-butyl acetate (sold by Rhodia) and spray applied over a previously applied basecoat and exhibited excellent flow and leveling, and minimum die-back or solvent popping.

EXAMPLE 3

A primer formulation was prepared as follows:

| Raw Material | Parts by Weight |
| --- | --- |
| Acrylic Polymer[1] | 36.64 |
| n-butyl acetate | 2.04 |
| Tone ® 310 polycaprolactone polyol From Union Carbide | 10.76 |
| Disperbyk ® 161 dispersant from Byk-Chemie | 4.0 |
| Butyl propionate | 2.04 |
| Carbon black | 0.42 |
| Kaolin clay | 11.42 |
| Titanium dioxide | 46.58 |
| Barium sulfate | 30.77 |
| Dibutyl tin dilaurate | 1.50 |
| Propionic acid | 0.30 |
| Methyl isobutyl ketone | 2.04 |

[1]polymer of 1.44/9.48/10.46/13.47/15.76 parts of axobismethylbutyronitrile/butyl methacrylate/methyl methacrylate/hydroxy ethylmethacrylate/isobornyl methacrylate in 49.40 parts toluene.

This pigmented primer/surfacer showed excellent pot life, and when spray applied to a metal substrate showed excellent flow and cure properties.

While the invention has been shown and described with respect to particular embodiments thereof, those embodiments are for the purpose of illustration rather than limitation, and other variations and modifications of the specific embodiments herein described will be apparent to those skilled in the art, all within the intended spirit and scope of the invention. Accordingly, the invention is not to be limited in scope and effect to the specific embodiments herein described, nor in any other way that is inconsistent with the extent to which the progress in the art has been advanced by the invention.

The entire disclosures of all applications, patents and publications cited herein are hereby incorporated by reference.

The invention claimed is:

1. A curable composition comprising a solvent solution of a mixture comprising:
   (i) at least one hydroxy-functional acrylic polymer having a number average molecular weight less than about 3000; and
   (ii) at least one polyol reactive diluent selected from the group consisting of ethylene glycol, dipropylene glycol, 2,2,4-trimethyl 1,3-pentanediol, neopentyl glycol, 1,2-propanediol, 1,4-butanediol, 1,3-butanediol, 2,3-butanediol, 1,5-pentanediol, 1,6-hexanediol, 2,2-dimethyl-1,3-propanediol, 1,4-cyclohexanedimethanol, 1,2-cyclohexanedimethanol, 1,3-cyclohexanedimethanol, 1,4-bis(2-hydroxyethoxy)cyclohexane, trimethylene glycol, tetramethylene glycol, pentamethylene glycol, hexamethylene glycol, decamethylene glycol, diethylene glycol, triethylene glycol, tetraethylene glycol, norbornylene glycol, 1,4-benzenedimethanol, 1,4-benzenediethanol, 2,4-dimethyl-2-ethylenehexane-1,3-diol, 2-butene-1,4-diol, trimethylolethane, trimethylolpropane, trimethylolhexane, triethylolpropane, 1,2,4-butanetriol, glycerol, pentaerythritol, and dipentaerythritol, the polyol reactive diluent having a number average molecular weight less than about 1,000;
   (iii) at least one polyisocyanate;
   (iv) a metal catalyst for accelerating the isocyanate/hydroxyl reaction; and
   (v) propionic acid.

2. The composition of claim 1 wherein the composition has a viscosity less than about 25 seconds when measured by a #2 Zahn cup when formulated at a VOC level of 3.5 pounds/gallon.

3. The composition of claim 1 wherein the polyol diluent has a number average molecular weight less than about 500.

4. The composition of claim 1 wherein the hydroxy-functional acrylic polymer has a number average molecular weight less than about 2,400.

5. The composition of claim 1 wherein the polyisocyanate is present at a level to provide about 0.3 to about 2.0 equivalents of isocyanate for each equivalent of active hydrogen from the acrylic resin and the polyol diluent.

6. The composition of claim 1 wherein the polyisocyanate is present at a level to provide about 0.7 to about 1.3 equivalents of isocyanate for each equivalent of active hydrogen from the acrylic resin and the polyol diluent.

7. The composition of claim 1 wherein the metal catalyst is a tin compound.

8. The composition of claim 1 wherein the propionic acid is present at a level of at least 0.1% of the total vehicle weight solids.

9. A curable composition comprising (on a weight solids basis of the vehicle solids):
   (i) 20-70% parts of a hydroxy functional acrylic polymer having a number average molecular weight less than about 3,000;

(ii) 2-30% of a low molecular weight polyol reactive diluent having a number average molecular weight less than about 1000 and being selected from the group consisting of ethylene glycol, dipropylene glycol 2,2,4-trimethyl 1,3-pentanediol, neopentyl glycol, 1,2-propanediol 1,4-butanediol, 1,3 butanediol, 2,3-butanediol, 1,5-pentanediol, 1,6-hexanediol, 2,2-dimethyl-1,3-propanediol, 1,4-cyclohexanedimethanol, 1,2-cyclohexanedimethanol, 1,3-cyclohexanedimethanol1,4-bis(2-hydroxyethoxy)cyclohexane, trimethylene glycol, tetramethylene glycol, pentamethylene glycol, hexamethylene glycol, decamethylene glycol, diethylene glycol, triethylene glycol, tetraethylene glycol, norbornylene glycol, 1,4-benzenedimethanol, 1,4-benzenediethanol, 2,4-dimethyl-2-ethylenehexane-1,3-diol, 2-butene-1,4-diol, trimethylolethane, trirmethylolpropane, trimethylolhexane, triethylolpronane, 1,2,4-butanetriol, glycerol, pentaerythritol, and dipentaerythritol;

(iii) 10-55% of a polyisocyanate;

(iv) at least 0.01% of a tin catalyst compound; and (v) 0.1 to about 3.0% propionic acid.

10. The composition of claim 9 wherein the composition has a viscosity less than about 25 seconds when measured by a #2 Zahn cup when formulated at a VOC level of 3.5 pounds/gallon.

11. The composition of claim 9 wherein the polyol diluent has a number average molecular weight less than about 500.

12. The composition of claim 9 wherein the hydroxy-functional acrylic polymer has a number average molecular weight less than about 2,400.

13. The composition of claim 9 wherein the polyisocyanate is present at a level to provide about 0.3 to about 2.0 equivalents of isocyanate for each equivalent of active hydrogen from the acrylic resin and the polyol diluent.

14. The composition of claim 9 wherein the polyisocyanate is present at a level to provide about 0.7 to about 1.3 equivalents of isocyanate for each equivalent of active hydrogen from the acrylic resin and the polyol diluent.

15. In a substrate coated with a multi-layer decorative and/or protective coating which comprises:

(a) a basecoat comprising a pigmented film-forming polymer, and (b) a transparent clearcoat comprising a film-forming polymer applied to the surface of the basecoat composition;

the improvement which comprises utilizing as the clearcoat and/or the basecoat a curable composition comprising:

(i) at least one hydroxy-functional acrylic polymer having a number average molecular weight less than about 3000; and (ii) at least one low molecular weight polyol reactive diluent having a number average molecular weight less than about 1000 and being selected from the group consisting of ethylene glycol, dipropylene glycol, 2,2,4-trimethyl 1,3-pentanediol, neopentyl glycol, 1,2-propanediol, 1,4-butanediol, 1,3-butanediol, 2,3-butanediol 1,5-pentanediol, 1,6-hexanediol, 2,2-dimethyl-1,3-propanediol, 1,4-cyclohexanedimethanol, 1,2-cyclohexanedimethanol, 1,3-cyclohexanedimethanol, 1,4-bis(2-hydroxyethoxy)cyclohexane, trimethylene glycol, tetramethylene glycol, pentamethylene glycol, hexamethylene glycol, decamethylene glycol, diethylene glycol, triethylene glycol, tetraethylene glycol, norbornylene glycol, 1,4-benzenedimethanol, 1,4-benzenediethanol, 2,4-dimethyl-2-ethylenehexane-1,3-diol, 2-butene-1,4-diol, trimethylolethane, trimethylolpropane, trimethylolhexane, triethylolpropane, 1,2,4-butanetriol, glycerol, pentaerythritol, and dipentaerythritol;

(iii) at least one polyisocyanate;

(iv) a metal catalyst for accelerating the isocyanate/hydroxyl reaction; and (v) propionic acid.

* * * * *